(No Model.)
R. H. ANDREWS.
WOOD WORKING MACHINE.
No. 250,181. Patented Nov. 29, 1881.
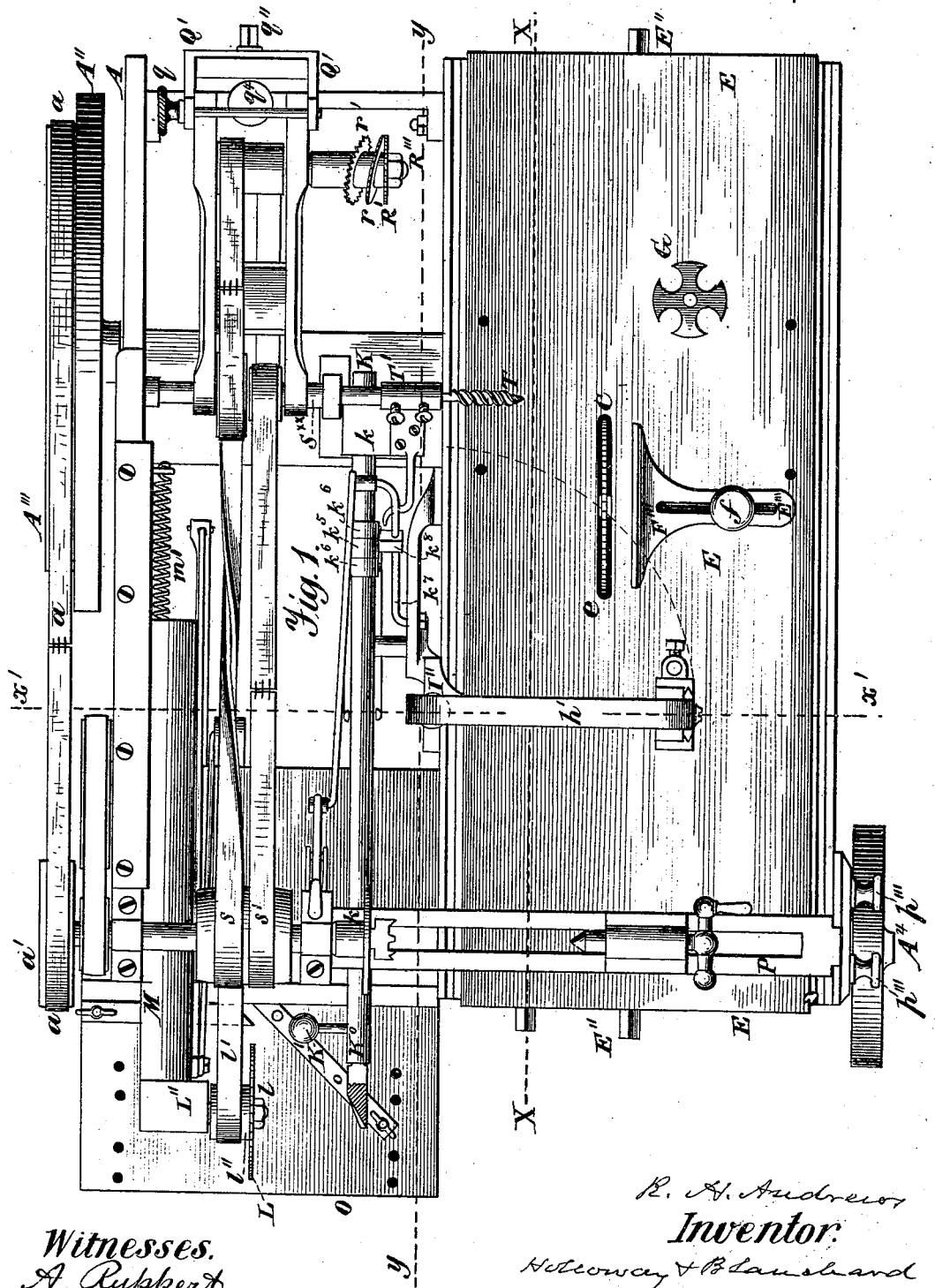
Witnesses.
A. Ruppert.
C. M. Connell
Inventor:
R. H. Andrews
Holloway & Blanchard
Attorneys
5 Sheets—Sheet 1.

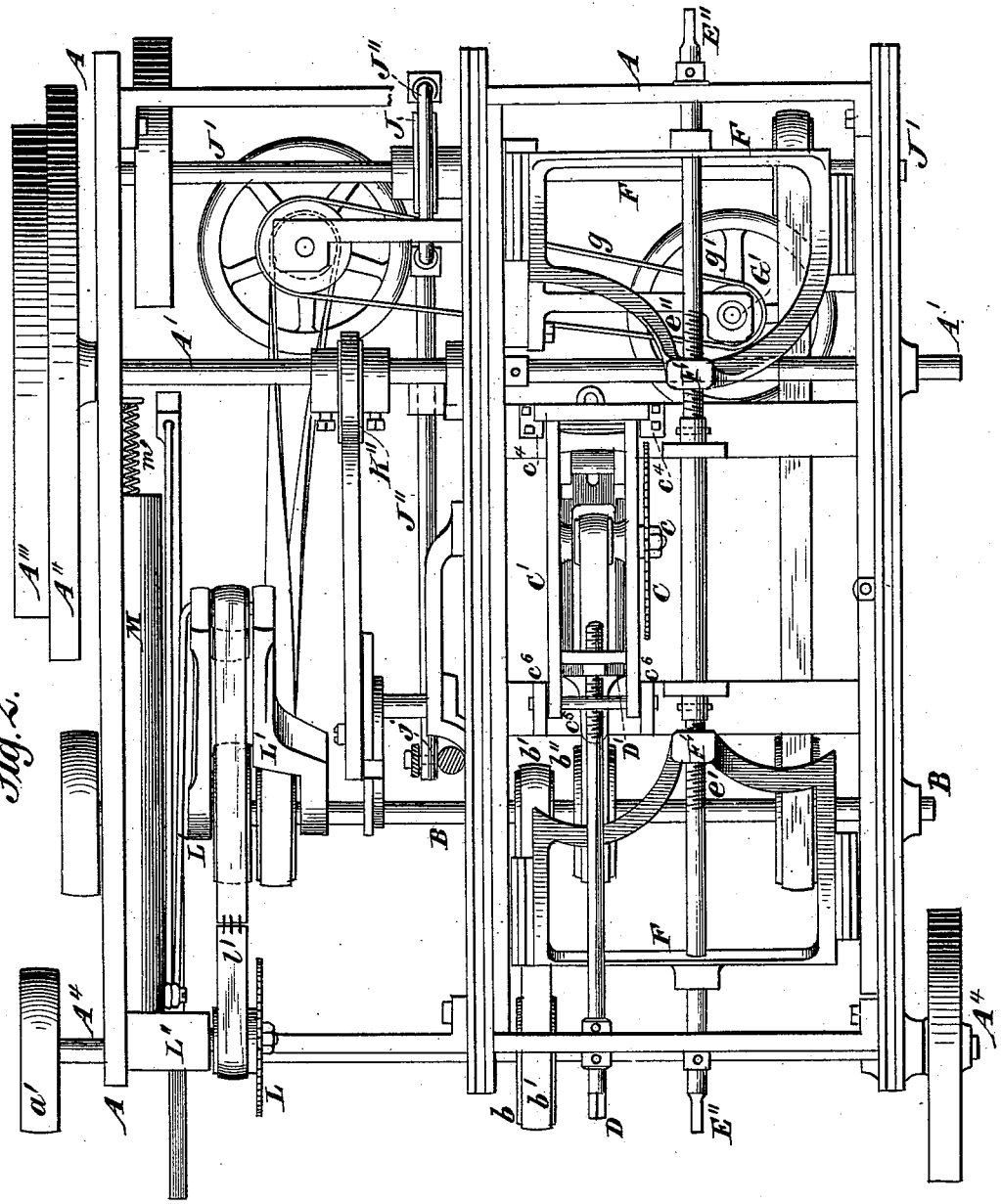

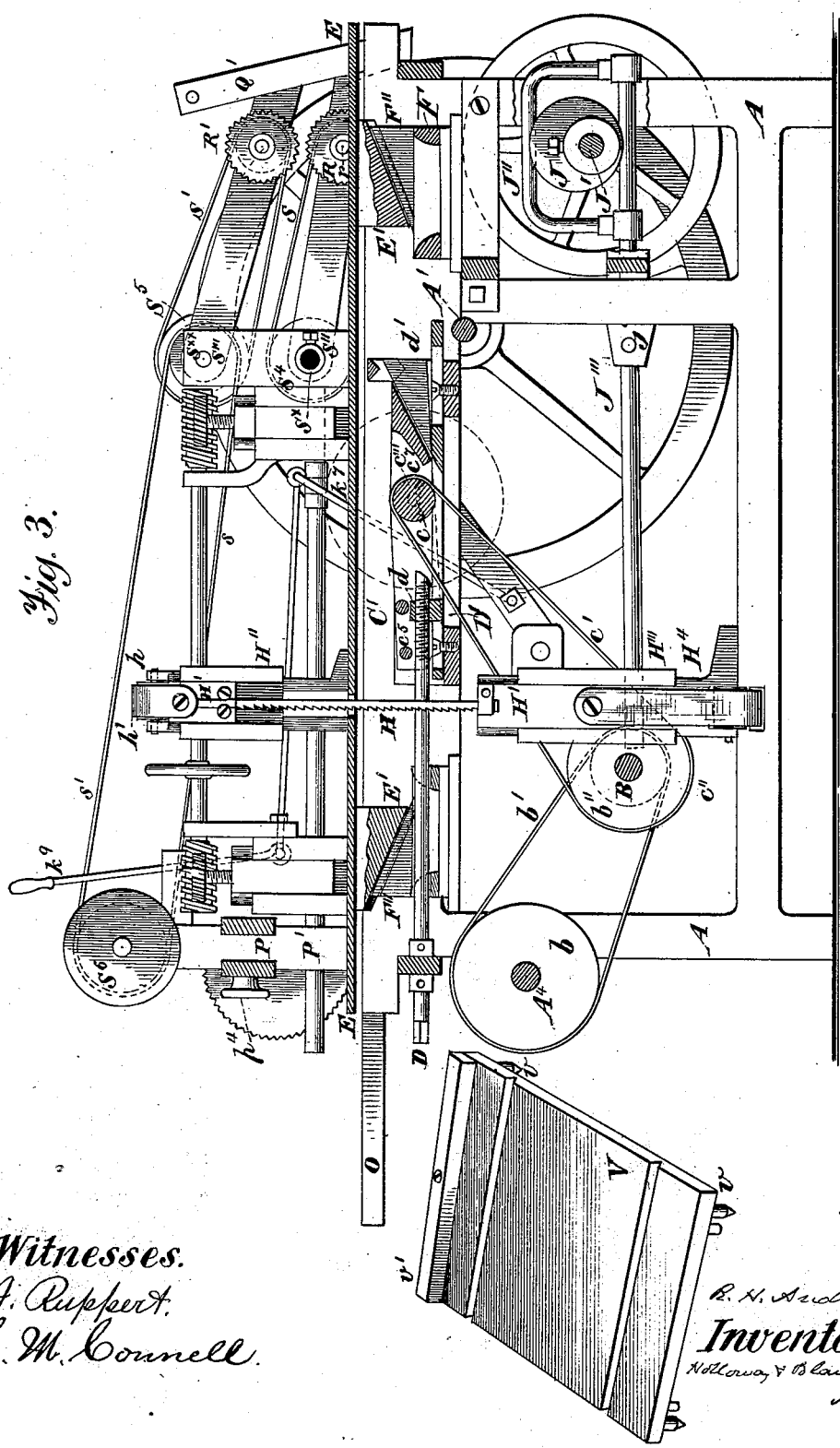

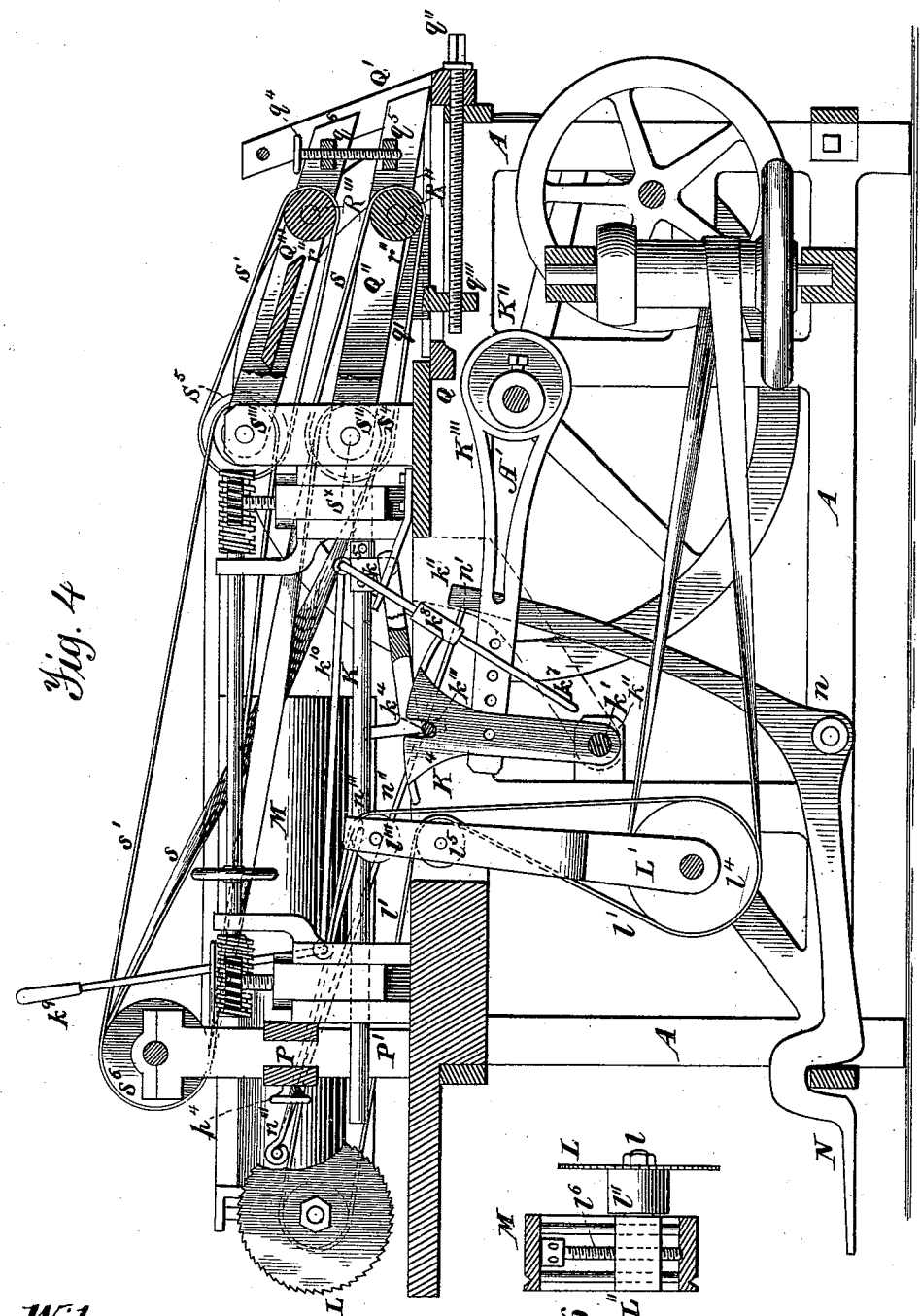

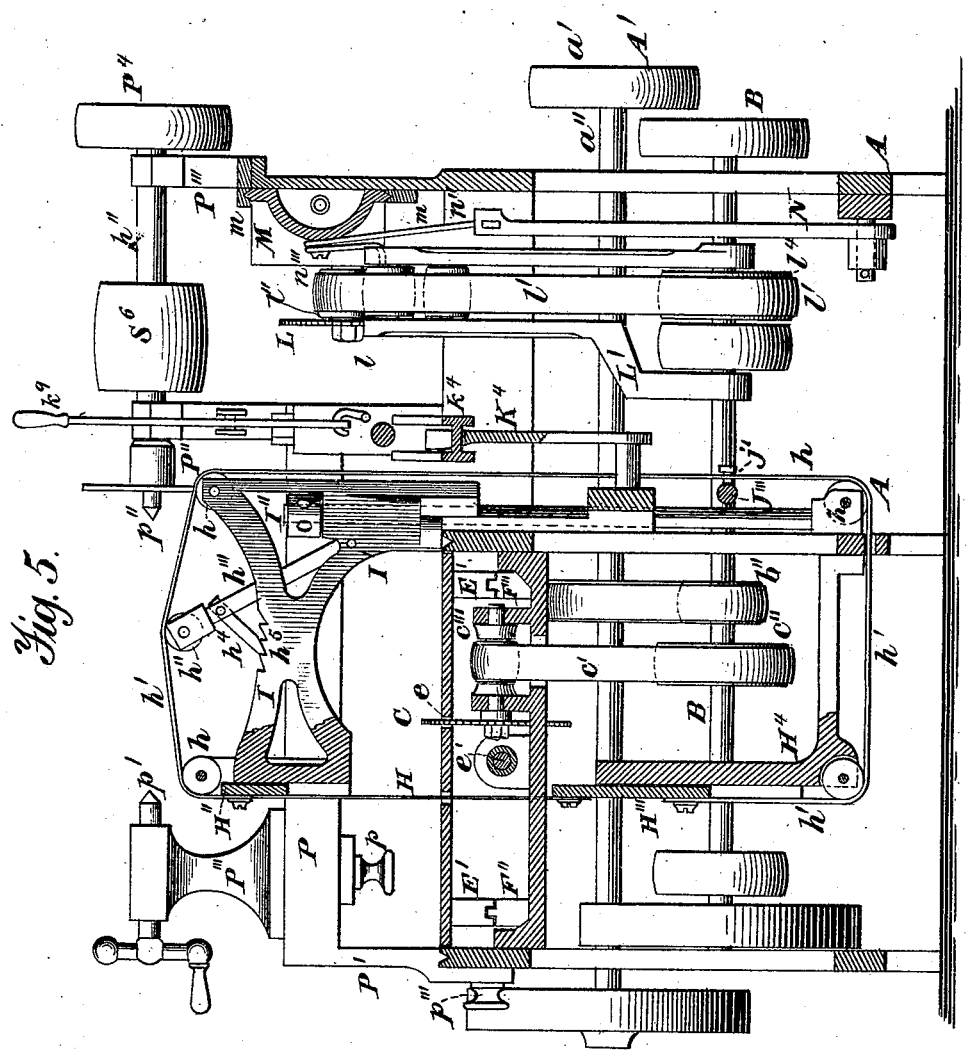

UNITED STATES PATENT OFFICE.

REUBEN H. ANDREWS, OF WASHINGTON, DISTRICT OF COLUMBIA.

WOOD-WORKING MACHINE.

SPECIFICATION forming part of Letters Patent No. 250,181, dated November 29, 1881.

Application filed August 10, 1881. (No model.)

*To all whom it may concern:*

Be it known that I, REUBEN H. ANDREWS, a citizen of the United States, residing at Washington, in the county of Washington and District of Columbia, have invented certain new and useful Improvements in Wood-Working Machines; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to improvements in machines for working wood; and it consists in the construction and combination of certain parts thereof, all of which are driven by the same power upon a single frame, as will be fully hereinafter described.

In the drawings, Figure 1, Sheet 1, represents a top or plan view of the device. Fig. 2, Sheet 2, represents a top view of the operating parts, having the saw-table removed. Fig. 3, Sheet 3, is an upright sectional view on line $x\,x$ of Fig. 1. Fig. 4, Sheet 4, is an upright sectional view on line $y\,y$ of Fig. 1. Fig. 5, Sheet 5, is an upright transverse sectional view on line $x'\,x'$ of Fig. 1; and Fig. 6, Sheet 4, is a sectional view of details.

A represents the frame which supports all the operating parts of the device.

A' is the main driving-shaft, placed in proper bearings and transversely across the frame A, and is revolved through band-pulley A'', from any convenient power, by belt or any known mechanical means.

A''' is a pulley outside of pulley A'' on shaft A', from which motion is given to pulley $a'$ on shaft $A^4$ through band $a$, Fig. 1.

B is a transverse horizontal shaft placed in bearings on the frame A, and motion is given to it through band $b'$, over pulley $b$ on shaft $A^4$, thence over pulley $b''$ on shaft B.

C is a circular ripping-saw, fast on arbor $c$, which has proper bearings in an adjustable pivoted frame, C', and is revolved by band $c'$ over pulley $c''$ on shaft B, thence over pulley $c'''$ on arbor $c$. Saw-frame C' is a rectangular frame, and adjustable as to height between the upright guides $c^4$ at one end, while the other end is pivoted at $c^5$ between upwardly-projecting studs $c^6$. Attached to the end opposite the pivotal point $c^5$, and underneath the frame, are inclines $c^7$, Fig. 3.

D is a horizontal screw-shaft in a bearing on frame A.

D' is a sliding horizontal frame working within the lower edge of frame C', in proper guideways.

$d$ is a screw-nut projecting upwardly from a transverse bar across frame D', and through which screw-shaft D is screwed.

$d'\,d'$ are inclines above frame D', at the opposite end of the frame to where nut $d$ is attached. These inclines $d'$ are under and in contact with inclines $c^7$ on frame C', but they incline in the opposite direction, so that as the screw-shaft is revolved in one direction without longitudinal movement, frame D' will be drawn toward the screw-shaft, forcing the inclines $d'$ to slide underneath and lift or raise the frame C' and saw C at that end, and by revolving the screw-shaft in the contrary direction the frame C' and saw C will be lowered. Hence the saw C is adjusted by this means to project more or less above the saw-table, as may be desired.

E is the saw-table, having slot $e$ through it for the saw to project up and above the table. Near the corners and underneath the table are inclines E' E', with the bearing-faces of the inclines on the outer edges thereof.

E'' is a screw-shaft placed centrally and longitudinally underneath the saw-table, and revolves in proper bearings in frame A, and so constructed that it cannot reciprocate lengthwise, and has right and left hand screw-threads $e'$ and $e''$ cut thereon, as seen in Fig. 2.

F F are sliding yokes, through which the screw-shaft passes.

F' F' are nuts cast or wrought upon the yokes F, and in which a screw-thread is cut, in one a right and in the other a left hand thread, so that as the screw-shaft is revolved in one direction the inclines F'' F'', that are secured on the yokes F and directly in line with and underneath the inclines E' on the table, their inclined faces coming together, will approach each other, and thereby elevate the table, and by turning the screw-shaft in the reverse direction the inclines F'' will go from each other and allow the table E to be lowered, and thereby the saw C will project more above the table, and reversing the revolution of the screw-shaft will raise the table, and the saw will project less above it.

F''' is the common adjustable and slotted saw-gage, held in place by the holding-screw $f$.

G is a revolving shaping-tool, the cutters of which are constructed to cut any desired shape. This cutter-head is fast upon the top of an upright revolving shaft, G', which is revolved by a band, $g$, around pulley $g'$, and gets its motion from another upright intermediate shaft from the horizontal shaft B.

H is a reciprocating upright gig-saw, attached at each end to a sliding cross-head, H' H', which has triangular or knife edges on opposite sides to fit into and freely slide in corresponding grooves in the head-stocks H'' at the upper end of the saw and H''' at the bottom of the saw. Head-block H''' is attached to the upright part of an elbow, H$^4$, which is firmly secured to the supporting-frame A, and head-block H'' is attached to a swinging arm, I, which swings, by having a bore in part I', around the holding-screw pin I''.

$h$ $h$ are band-carrying anti-friction wheels, so placed and secured as to form a parallelogram.

$h'$ is a band, one end of which is secured to the upper head-stock, and the band is then passed over and around the carrying-wheels $h$ and the other end secured to the lower cross-head.

$h''$ is band-tightener pulley, freely turning on an axis in the slotted head of pivoted and inclined bar $h'''$, and $h^4$ is a pawl, pivoted to arm $h'''$, and takes into notches $h^5$ in the top side of arm I as the inclined bar $h'''$ is raised toward a perpendicular position, and when so raised and held by the pawl the saw-band $h'$ is tightened. The saw H is reciprocated by means of an eccentric, J, fixed around shaft J' and working in yoke J'', connected to a pivoted oscillating bar, J''', pivoted at $j$ to frame A, which, at its extreme end, has a wrist-pin, $j'$, inserted into the saw-band $h'$, and as the eccentric revolves the pivoted bar J''' gives an up-and-down motion to band $h'$, which, in turn, reciprocates the saw H. By taking the saw H from the sliding cross-heads and loosening the holding-screw pin I'' the arm I can be swung around out of the way of any work being done on saw-table E, as seen in Fig. 1 by the broken circular lines upon the table.

K is a reciprocating chisel-holder shaft for mortising, and freely slides in proper boxes, $k$ $k$, fast on frame A.

K$^0$ is the chisel-holder on shaft K.

K' is reversing-lever, attached to shaft K, to reverse the chisel when necessary. Shaft K is reciprocated by means of an eccentric, K'', on shaft A', and loop-arm K''', one end of which surrounds the eccentric, and the other connects with a vibrating-arm, K$^4$, pivoted at its lower end, at $k'$, to brace $k''$, which is firmly secured to frame A. Arm K$^4$ has a notch, $k'''$, in its top, into which dog $k^4$ is placed, the dog having arms that extend back and are connected to sleeve $k^5$, which surrounds shaft K in such a manner as to allow the shaft to turn therein to reverse the chisel, and firmly attached to the shaft, and on each side of sleeve $k^5$ are stops $k^6$, which hold the sleeve in position on the shaft and prevent its slipping longitudinally thereon, and as the eccentric revolves the arm K'' is vibrated, forcing the dog through its arms and sleeve to reciprocate the shaft K. When it is necessary to stop the reciprocation of the chisel-shaft the dog $k^4$ is raised out of the notch in arm K$^4$ by an arm, $k^7$, having a carrying projection and guides, $k^8$, thereon that take hold of the under side of the arms to dog $k''$ and lift them up and the dog out of the notch in arm K$^4$. This is accomplished by throwing the pivoted lever $k^9$ over, which draws a connecting-rod, $k^{10}$, that is fast to the top end of arm $k^7$, in the opposite direction, and the dog is raised out of the notch, and the shaft will not then reciprocate.

L is a horizontally-reciprocating cross-cut circular saw fast on its arbor $l$, and is revolved by band $l'$ around pulley $l''$ on arbor $l$ over a carrying-pulley, $l'''$, thence around pulley $l^4$ on shaft B, and back up and over the guide-pulley $l^5$ to pulley $l''$. Pulleys $l'''$ and $l^5$ are in a swinging frame, L', that vibrates freely upon the axial center of shaft B, and so that the frame will vibrate or swing easily and allow the saw L to be reciprocated horizontally. Arbor $l$ in box L'' is, with the box, adjustable as to height by the temper or adjusting screw $l^6$, so as to cut deeper or shallower, as desired. Box L'' is firmly secured to the end of a reciprocating carriage, M, which carriage is constructed to slide freely between guideways $m$ $m$, that are secured properly to frame A.

N is a bent pivoted treadle-lever for reciprocating the saw L, is pivoted at $n$ to frame A, and extends upward to be attached to rod $n'$, which extends to and is pivoted at $n''$ to carriage M.

$n'''$ is a rod attached to the upper end of swinging frame L', thence goes to and is pivoted to carriage M at $n''$, which construction, as the treadle-lever is forced down, as seen in Fig. 4, will force the saw and its driving-belt in the same direction, and the driving-belt of the saw will be at the same strain all the time.

$m'$ is a spiral or any equivalent return-spring, one end being fast to frame A and the other fast to the carriage M, and is strong enough to return the carriage and saw to its normal position as soon as the treadle-lever is released from pressure.

O is the table to support whatever is placed upon it to be sawed by the saw L, and it may be constructed to hold the stuff to be sawed at a right angle or any other angle desired by having the saw-guides O adjustable thereon.

P is a removable bed to a turning-lathe, resting upon posts P' attached by screws to frame A in any convenient manner.

P'' is the head-stock, and P''' is the tail-stock, to the lathe, which can be adjusted upon the bed P and held fast by holding-screw $p$.

$p'$ is the screw-center in stock P''', and $p''$ is the pulley-arbor and driving-center in head-stock P'''. The arbor or shaft $p''$ revolves in bearings in the head-stock P'' and post P''' attached to or a part of frame A, and is put in revolution by pulley $P^4$ on arbor $p''$ through a band from a pulley on shaft B, or from any other convenient driving pulley or means. By unscrewing the screws $p'''$ and $p^4$ the lathe-bed P can be detached from the table A and removed therefrom.

Q is a frame attached to frame A, and has inclined outer posts, Q', and a clamping-screw, $q$, at the top and horizontally through the posts, to clamp and hold them in desired positions.

Q'' is a frame pivoted about a shaft and adjustable between the posts Q', and Q''' is another frame, like frame Q'', and is also adjustable between posts Q'. The lower frame, Q'', is adjusted up or down by inclines or wedges $q'$, actuated by screw $q''$, that passes through frame A, and is held from longitudinal movement and works in a screw-nut, $q'''$, that drops below a cross-bar which unites the two wedges $q'$, and by turning the screw $q''$ in one direction forces the wedges under the inclined frame Q'' and raises the outer end thereof between the posts Q', and by reversing the revolution of screw $q''$ the wedges will be forced back and the frame will fall down. The upper frame, Q''', is adjusted higher or lower by the screw $q^4$ in nuts $q^5$ in frame Q'' and $q^6$ in frame Q'''.

R and R' are shoulder-cutting circular saws on arbors R'' and R''', and $r$ and $r'$ are wabble or drunken saws on the same arbors, for the purpose of cutting tenons on the end of a piece of stuff by passing the piece sidewise between the saws on the two arbors. The arbors R'' and R''' have each a pulley, $r''$, fast thereon to revolve the saws by means of belts S and S', which get their motion from pulleys $S^4$ and $S^5$ on shafts $S^x$ and $S^{xx}$, between the frames Q'' and Q''', and these shafts get their motion from a pulley, $S^6$, on arbor $p''$, and belts $s$ and $s'$, belt $s$ driving the lower pulleys, S'' and $S^4$, and belt $s'$ the upper pulleys, S''' and $S^5$. By this construction any desired thickness of tenon can be made up to the extent of the separation of the saws that form the tenon.

T is a boring-tool fast in head of tool-stock T', which is an extension of shaft $S^x$, which shaft revolves in bearings fast on frame A, and is put in revolution by the belt $s$ from pulley $S^6$ over pulley S''. The material to be bored is worked from the table E, which, as has been previously described, can be raised or lowered to suit the boring-tool.

V, Fig. 3, is a removable table, which can be used upon table E for holding and guiding the stuff to be bored, or for holding and carrying the stuff to the tenoning-saws, and is also used upon table O by inserting the pins $v$ in corresponding holes in tables E and O.

$v'$ is an adjustable guide upon table V, and can be adjusted to any angle required, so that angles or miters can be sawed, a beveled shoulder formed on a tenon, or an inclined hole bored in stuff to be worked.

The bringing together of all the different tools or devices for working wood upon a single supporting-frame and convenient for easy and rapid use is an improvement over the usual use of similar devices that are separated and distant from each other, saving time in handling the material to be worked or operated upon.

I do not confine myself to the exact construction described as the means for operating the several devices, as constructions in conveying or giving motion to the several parts may be varied without departing from the principle, and so may the location of the devices be changed upon the supporting-frame with relation to each other without changing my invention, as it is not the precise place that a device occupies that is my invention; but,

Having thus described my invention, what I claim, and desire to secure by Letters Patent, is—

1. The combination of the adjustable table E, the reciprocating gig-saw H, with its cross-heads H' H', eccentric J, oscillating bar J''', and band $h'$, or their equivalents, the parts being arranged for operation substantially as set forth.

2. The combination of the vertically-adjustable table E, resting upon sliding yokes F F, and the circular ripping-saw C, adjustable as to its height by wedges and screw, substantially as and for the purpose specified.

3. In combination with the adjustable table E, the shaping-tool G, gig-saw H, and circular rip-saw C, as and for the purposes set forth.

In testimony whereof I affix my signature in presence of two witnesses.

REUBEN H. ANDREWS.

Witnesses:
C. M. CONNELL,
A. RUPPERT.